(12) United States Patent
Lin et al.

(10) Patent No.: US 6,820,993 B1
(45) Date of Patent: Nov. 23, 2004

(54) PLANAR LIGHT EMITTING MECHANISM

(75) Inventors: Ching-Huang Lin, Penghu (TW);
Hua-Nan Huang, Miaoli (TW)

(73) Assignee: Toppoly Optoelectronics Corp.,
Chu-Nan (TW)

( * ) Notice: Subject to any disclaimer, the term of this patent is extended or adjusted under 35 U.S.C. 154(b) by 0 days.

(21) Appl. No.: 10/644,518

(22) Filed: Aug. 20, 2003

(51) Int. Cl.[7] .................................................. F21V 7/04
(52) U.S. Cl. ........................... 362/31; 349/65; 362/216; 313/493
(58) Field of Search ................................. 313/485, 493, 313/634; 362/31, 216, 561; 349/65, 70

(56) References Cited

U.S. PATENT DOCUMENTS 5,949,505 A * 9/1999 Funamoto et al. ............ 349/65
6,286,971 B1 * 9/2001 Hori .............................. 362/31
6,336,728 B1 * 1/2002 Deloy .......................... 362/31
6,674,250 B2 * 1/2004 Cho et al. .................... 315/291

* cited by examiner

Primary Examiner—Vip Patel
Assistant Examiner—Glenn D. Zimmerman
(74) Attorney, Agent, or Firm—Quintero Law Office

(57) ABSTRACT

The planar light emitting mechanism comprises a rectangular light guiding plate and a lamp. The lamp is disposed on a side of the light guiding plate, having a brighter effective emitting area and two curved darker emitting areas. The darker emitting areas are adjacent to the corners of the rectangular light guiding plate, wherein the brighter effective emitting area is between the darker emitting areas.

10 Claims, 3 Drawing Sheets

PLANAR LIGHT EMITTING MECHANISM

BACKGROUND OF THE INVENTION

1. Field of the Invention

The present invention relates to a planar light emitting mechanism, and in particular to a planar light emitting mechanism having a curved Cold Cathode Fluorescent Lamp (CCFL) to eliminate dark zones.

2. Description of the Related Art

With the progress of semiconductor and flat panel display manufacturing technology, conventional Liquid Crystal Displays (LCDs) have been increasingly applied in electronic devices such as notebook computers.

FIG. 1 is a top view of a conventional planar light emitting mechanism of an LCD, wherein a longitudinal Cold Cathode Fluorescent Lamp (CCFL) 3, used as the light source of the planar light emitting mechanism, is disposed on a side of a light guiding plate 1. Light emitted from the Cold Cathode Fluorescent Lamp 3 enters the light guiding plate 1 and then propagates out therefrom. Reference numeral 2 indicates the light emitting region 2 of the planar light emitting mechanism.

The conventional Cold Cathode Fluorescent Lamp 3 has two darker emitting areas 31 at both ends, where the luminance is lower than the average luminance of the overall Cold Cathode Fluorescent Lamp 3, and a brighter effective emitting area 32 at the middle. That is, the ends of Cold Cathode Fluorescent Lamp 3 are darker than the middle. As a result, the light emitting region 2 of the planar light emitting mechanism has two dark corners 21 adjacent to the darker emitting areas of the Cold Cathode Fluorescent Lamp 3. That is deemed a defect for an LCD and must be avoided. Locating the darker emitting areas away from the light guiding plate 1 to eliminate the dark corners by elongation of the Cold Cathode Fluorescent Lamp 3 is not feasible, because the dimensions of the LCD limit the length of the Cold Cathode Fluorescent Lamp 3. Broken lines A and A' indicate the boundaries of a region in which the Cold Cathode Fluorescent Lamp 3 can extend in length.

To address the disadvantage of the conventional planar light emitting mechanism mentioned above, the present invention discloses a planar light emitting mechanism providing uniform luminance without occurrence of dark zones.

SUMMARY OF THE INVENTION

An object of the invention is to provide a planar light emitting mechanism having a curved Cold Cathode Fluorescent Lamp (CCFL) to provide uniform luminance without occurrence of dark zones.

The planar light emitting mechanism in accordance with the present invention comprises a rectangular light guiding plate and a lamp. The lamp is disposed on a side of the light guiding plate, having a brighter effective emitting area and two curved darker emitting areas. The darker emitting areas are adjacent to the corners of the rectangular light guiding plate, wherein the brighter effective emitting area is between the darker emitting areas.

In another embodiment, the light guiding plate has two round corners corresponding to the darker emitting areas of the Cold Cathode Fluorescent Lamp. The round corners of the light guiding plate generate a light gathering effect to increase the intensity of light emitted from the darker emitting areas of the Cold Cathode Fluorescent Lamp. Thus, the light intensity increases at the corners of the light guiding plate without occurrence of dark zones.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1:
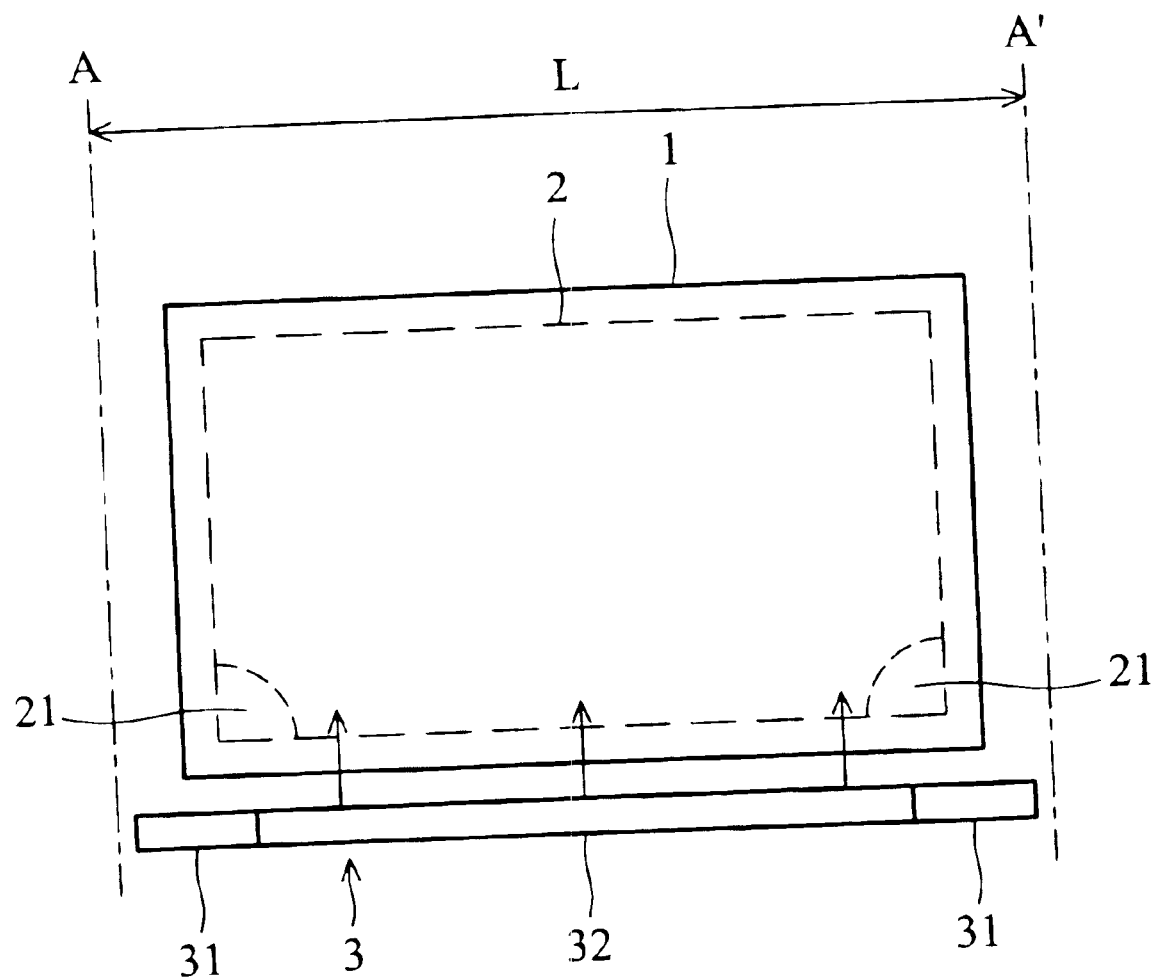
FIG. 1 is a top view of a conventional planar light emitting mechanism.
Figure 2:
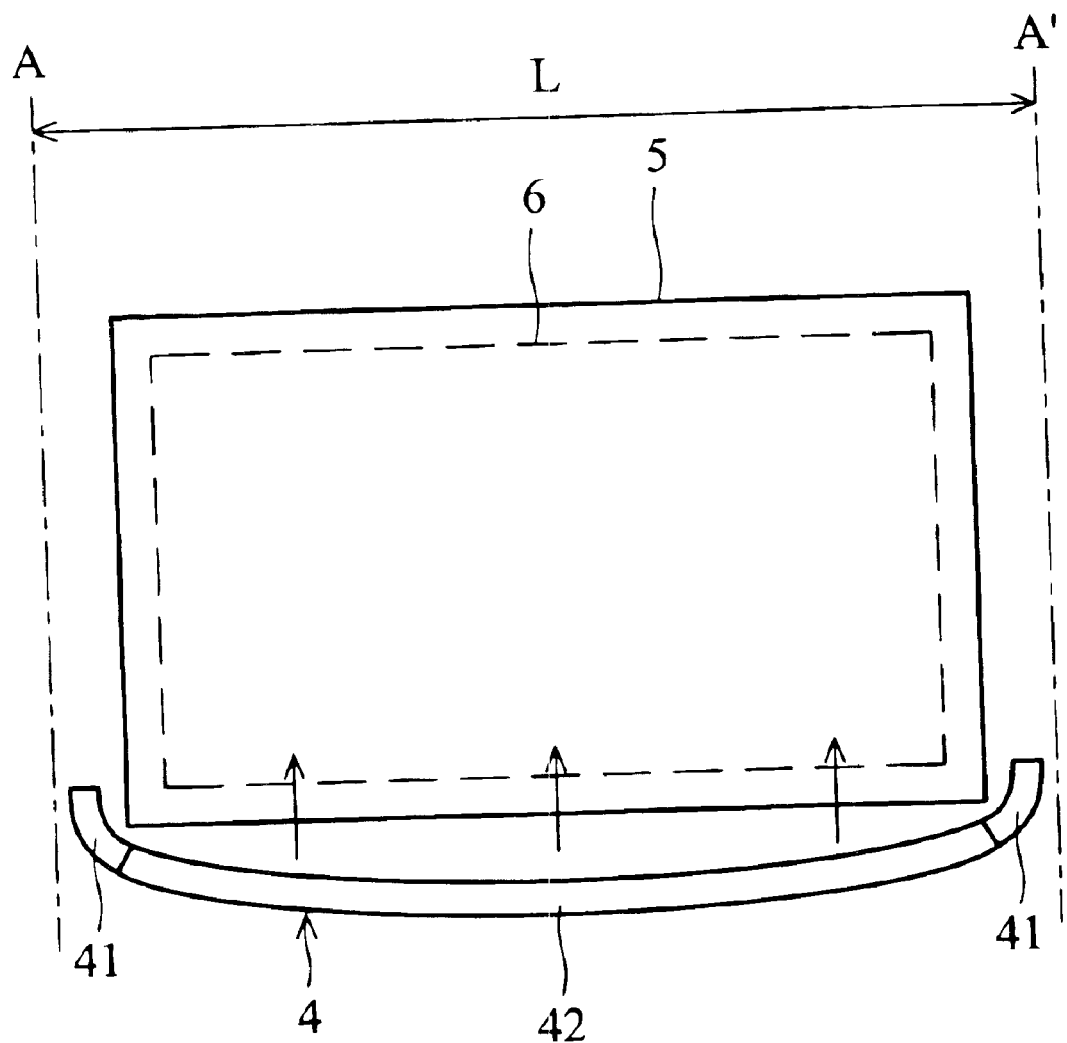
FIG. 2 is the first embodiment of the planar light emitting mechanism in accordance with the present invention.

FIG. 2 is the first embodiment of the planar light emitting mechanism in accordance with the present invention. As shown in FIG. 2, the planar light emitting mechanism of the present invention is provided with a Cold Cathode Fluorescent Lamp 4 and a light guiding plate 5. The Cold Cathode Fluorescent Lamp 4 is curved and disposed on a side of the light guiding plate 5, including two darker emitting areas 41 and a brighter effective emitting area 42. In FIG. 2, the darker emitting areas 41 are at both ends of the Cold Cathode Fluorescent Lamp 4, wherein the brighter effective emitting area 42 is between the darker emitting areas 41. Moreover, reference numeral 6 indicates the light emitting region 6 of the planar light emitting mechanism. Light emitted from the Cold Cathode Fluorescent Lamp 4 enters the light guiding plate 5 and then propagates out therefrom.

As mentioned above, the luminance of the darker emitting areas 41 is lower than the average luminance of the overall Cold Cathode Fluorescent Lamp 4. That is, the ends of Cold Cathode Fluorescent Lamp 4 are darker than the middle. With the curved shape, both ends of the Cold Cathode Fluorescent Lamp 4 extend to the intervals between the boundaries A, A' and the light guiding plate 5 (as shown in FIG. 2). Particularly, the curved Cold Cathode Fluorescent Lamp 4 is longer than the conventional longitudinal lamp (substantially longer than the length L from the boundaries A to A') such that the brighter effective emitting area 42 illumination area increases. Moreover, dark zones caused by the darker emitting areas 41 can be also avoided due to the ends of the curved Cold Cathode Fluorescent Lamp 4 extending into the intervals between the boundaries A, A' and the light guiding plate 5.

Thus, light emitted from the brighter effective emitting area 42 of the Cold Cathode Fluorescent Lamp 4 can entirely cover the bottom side of the light guiding plate 5 to provide a uniform planar luminance without occurrence of dark zones caused by the darker emitting areas 41.

Second Embodiment

Figure 3:
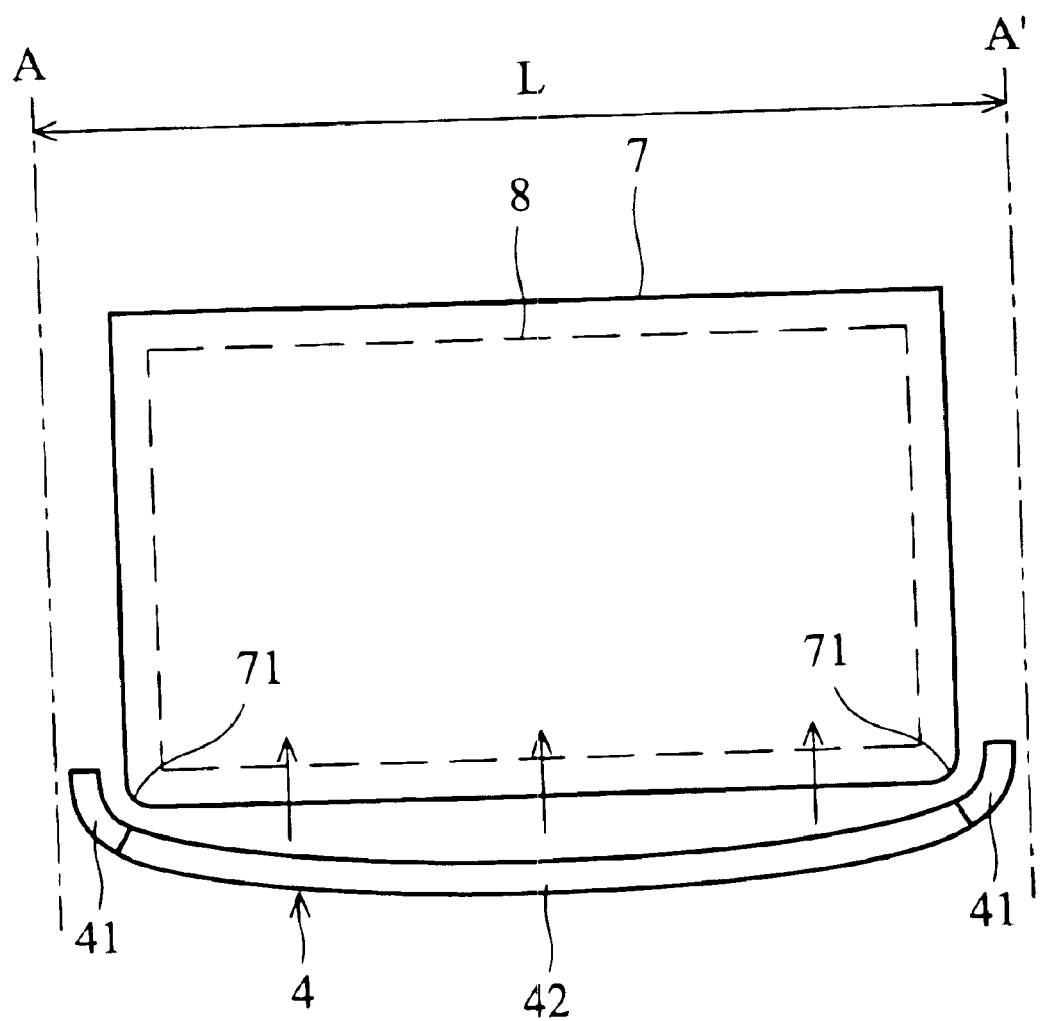
FIG. 3 is the second embodiment of the planar light emitting mechanism in accordance with the present invention.

FIG. 3 is the second embodiment of the planar light emitting mechanism in accordance with the present invention. As shown in FIG. 3, the planar light emitting mechanism is provided with a Cold Cathode Fluorescent Lamp 4 and a light guiding plate 7. The Cold Cathode Fluorescent Lamp 4 is curved and disposed on a side of the light guiding plate 7. As mentioned above, the Cold Cathode Fluorescent Lamp 4 has two darker emitting areas 41 and a brighter effective emitting area 42. The darker emitting areas 41 are at both ends of the Cold Cathode Fluorescent Lamp 4, where the luminance is lower than the average luminance of the overall Cold Cathode Fluorescent Lamp 4, and a brighter effective emitting area 32 at the middle.

Reference numeral 8 indicates the light emitting region 8 of the planar light emitting mechanism. Light emitted from the Cold Cathode Fluorescent Lamp 4 enters the light guiding plate 7 and then propagates out therefrom. Referring to FIG. 3, with the curved shape, both ends of the Cold Cathode Fluorescent Lamp 4 extend to the intervals between the boundaries A, A' and the light guiding plate 5.

In this embodiment, the light guiding plate 7 is substantially rectangular and has round corners 71 corresponding to the darker emitting areas 41 of the Cold Cathode Fluorescent Lamp 4 (as shown in FIG. 3). The round corners 71 of the light guiding plate 7 generate a light gathering effect to increase the intensity of light emitted from the darker emitting areas 41. Thus, the illumination efficiency and the light intensity increases at the corners of the light guiding plate 7 due to the round corners 71.

As the curved Cold Cathode Fluorescent Lamp 4 is longer than the conventional longitudinal lamp (substantially longer than the length L from the boundary A to A'), the brighter effective emitting area 42 illumination area increases. Furthermore, the dark zones caused by the darker emitting areas 41 can be also avoided due to the ends of the curved Cold Cathode Fluorescent Lamp 4 extending into the intervals between the boundaries A, A' and the light guiding plate 7.

In summary, the planar light emitting mechanism of the present invention is provided with a curved Cold Cathode Fluorescent Lamp 4 longer than the conventional longitudinal lamp. The dark zones can be avoided by extending the darker emitting areas 41 at both ends of the Cold Cathode Fluorescent Lamp 4 into the intervals between the boundaries A, A' and the light guiding plate. Furthermore, the round corners 71 of the light guiding plate 7 generate a light gathering effect to increase the intensity of light emitted from the darker emitting areas 41. Thus, a uniform planar luminance is provided without occurrence of dark zones according to the present invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A planar light emitting mechanism, comprising:
   a rectangular light guiding plate,
   a lamp, disposed on a side of the light guiding plate, having a brighter effective emitting area totally distributed along the side of the light guiding plate in a concave shape with respect thereto and a curved darker emitting area adjacent to a corner of the light guiding plate.

2. The planar light emitting mechanism as claimed in claim 1, wherein the brighter effective emitting area is curved.

3. The planar light emitting mechanism as claimed in claim 1, wherein the lamp is tubular and longer than the side of the light guiding plate.

4. The planar light emitting mechanism as claimed in claim 1, wherein the lamp is a Cold Cathode Fluorescent (CCFL).

5. The planar light emitting mechanism as claimed in claim 1, wherein the lamp has a plurality of curved darker emitting areas.

6. A planar light emitting mechanism, comprising:
   a rectangular light guiding plate having at least a round corner;
   a lamp, disposed on a side of the light guiding plate, having a brighter effective emitting area totally distributed along the side of the light guiding plate in a concave shape with respect thereto and two darker emitting areas, wherein the brighter effective emitting area is between the darker emitting areas, and at least a darker emitting area is adjacent to the round corner.

7. The planar light emitting mechanism as claimed in claim 6, wherein the darker emitting areas are curved.

8. The planar light emitting mechanism as claimed in claim 6, wherein the brighter effective emitting area is curved.

9. The planar light emitting mechanism as claimed in claim 6, wherein the lamp is longer than the side of the light guiding plate.

10. The planar light emitting mechanism as claimed in claim 6, wherein the lamp is a Cold Cathode Fluorescent Lamp (CCFL).

* * * * *